(12) United States Patent
Wilson

(10) Patent No.: US 10,690,946 B2
(45) Date of Patent: Jun. 23, 2020

(54) FLEXIBLE PHOTONIC CRYSTALS WITH COLOR-CHANGING STRAIN RESPONSE

(71) Applicant: Apple Inc., Cupertino, CA (US)

(72) Inventor: James R. Wilson, San Jose, CA (US)

(73) Assignee: APPLE INC., Cupertino, CA (US)

( * ) Notice: Subject to any disclaimer, the term of this patent is extended or adjusted under 35 U.S.C. 154(b) by 598 days.

(21) Appl. No.: 15/236,219

(22) Filed: Aug. 12, 2016

(65) Prior Publication Data
US 2017/0059890 A1    Mar. 2, 2017

Related U.S. Application Data

(60) Provisional application No. 62/210,384, filed on Aug. 26, 2015.

(51) Int. Cl.
*G02F 1/01* (2006.01)
*G02B 1/00* (2006.01)
*G01L 1/24* (2006.01)

(52) U.S. Cl.
CPC ............ *G02F 1/0131* (2013.01); *G01L 1/24* (2013.01); *G02B 1/005* (2013.01)

(58) Field of Classification Search
CPC ... G02B 1/005; B02B 6/122; G02F 2202/022; G02F 2202/32; G02F 1/0131; G02F 1/0128; G02F 1/01708; G02F 1/01; G01L 1/00
USPC ........................................................ 359/240
See application file for complete search history.

(56) References Cited

U.S. PATENT DOCUMENTS

| | | | | |
|---|---|---|---|---|
| 8,363,303 B2 * | 1/2013 | Horning | ................ | B82Y 20/00 359/290 |
| 8,424,765 B2 * | 4/2013 | Doraiswami | ...... | G06K 19/0672 235/435 |
| 8,548,283 B2 * | 10/2013 | Kilic | ...................... | G01H 9/004 29/428 |
| 8,676,016 B2 * | 3/2014 | Arsenault | ............. | B82Y 20/00 385/129 |
| 8,718,415 B2 * | 5/2014 | Magnusson | ............ | G02B 6/124 385/11 |
| 8,848,280 B2 | 9/2014 | Arsenault | | |
| 9,022,648 B2 * | 5/2015 | Vanier | .................... | B82Y 40/00 374/161 |
| 9,226,542 B2 * | 1/2016 | Hartford | ............. | A43B 1/0027 |
| 9,301,569 B2 * | 4/2016 | Donovan | ............. | A43B 1/0027 |

(Continued)

*Primary Examiner* — William R Alexander
*Assistant Examiner* — Tamara Y. Washington
(74) *Attorney, Agent, or Firm* — Dorsey & Whitney LLP

(57) ABSTRACT

Flexible photonic crystal structures capable of changing color in response to strain are described. Methods for forming two-dimensional and three-dimensional flexible photonic crystal structures are described. In some aspects, the flexible photonic crystal structures include an array of holes or voids formed within a flexible material. The flexible material changes dimensions of the array when the flexible photonic crystal structures is stretched, pulled, pushed or bent. In some aspects, the flexible photonic crystal structures include an array of features made of a first material, such as a first type of polymer, embedded within a matrix material made of a second material, such as a second type of polymer. The flexible photonic crystal structures can be used in the manufacture of consumer products, such as electronic products, electronic product accessories, thin films, flexible displays and wearable products.

20 Claims, 12 Drawing Sheets

(56) References Cited

U.S. PATENT DOCUMENTS

| | | | | |
|---|---|---|---|---|
| 9,411,074 | B2* | 8/2016 | Whiteman | B42D 25/29 |
| 9,546,912 | B2* | 1/2017 | Chan | G01K 3/04 |
| 9,572,753 | B2* | 2/2017 | Sun | A61K 6/0835 |
| 9,861,445 | B2* | 1/2018 | Saotome | G06K 7/10366 |
| 9,995,690 | B2* | 6/2018 | Bovero | G02B 5/1861 |
| 2004/0008934 | A1* | 1/2004 | Takiguchi | B82Y 20/00 385/27 |
| 2010/0045027 | A1* | 2/2010 | Whiteman | B44F 1/10 283/107 |
| 2010/0245978 | A1* | 9/2010 | Baumberg | B82Y 20/00 359/291 |
| 2012/0044970 | A1 | 2/2012 | Arsenault | |
| 2013/0001940 | A1 | 1/2013 | Arsenault et al. | |
| 2013/0003159 | A1* | 1/2013 | Yeh | B82Y 20/00 359/290 |
| 2013/0258445 | A1* | 10/2013 | Arsenault | G02B 6/1225 359/290 |
| 2016/0170091 | A1* | 6/2016 | Li | C08F 2/22 424/401 |
| 2016/0326334 | A1* | 11/2016 | Jiang | G01N 21/00 |
| 2017/0023807 | A1* | 1/2017 | Chang-Hasnain | G02F 1/0131 |
| 2017/0031184 | A1* | 2/2017 | Lo | G02F 1/0128 |

* cited by examiner

FLEXIBLE PHOTONIC CRYSTALS WITH COLOR-CHANGING STRAIN RESPONSE

CROSS REFERENCE TO RELATED APPLICATION

This application claims the benefit of priority under 35 U.S.C. § 119(e) to U.S. Provisional Application No. 62/210,384, entitled "FLEXIBLE PHOTONIC CRYSTALS WITH COLOR-CHANGING STRAIN RESPONSE," filed on Aug. 26, 2015, which is incorporated by reference herein in its entirety.

FIELD

This disclosure relates generally to photonic crystal structures and methods for forming the same. In particular embodiments, the photonic crystals include flexible material that causes the photonic crystals to change color in response to pressure, bending or other types of strain.

BACKGROUND

Photonic crystals are periodic microstructures that affect the motion of photons that are incident upon the photonic crystals in a way that causes visual effects. These structures manipulate specific wavelengths of light, resulting in a visually varied or patterns of color. Unlike colored objects that contain chemical substances that reflect and absorb certain wavelengths of light to give the object a particular color, photonic crystals reflect color by its physical microstructures, and are therefore said to reflect color by "structural coloration."

Examples of photonic crystal structures in nature include some butterfly wings that are brilliant iridescent blue due to microstructures within the butterfly wing. Photonic crystals can also be fabricated using stacks of dielectric layers of material or by forming two-dimensional patterns within a substrate. For example, two materials having different refractive indices arranged in very closely packed array patterns can create such photonic crystal effects. However, fabricated photonic crystals have fixed microstructures, and therefore have fixed responses to incident light and therefore have corresponding fixed colors.

SUMMARY

This paper describes various embodiments that relate to photonic crystal structures capable of changing color in response to strain or stress. The systems and methods described can be used in the manufacture of consumer products, such as electronic products and electronic product accessories.

According to one embodiment, a flexible structure having an appearance that changes color when subjected to stress is described. The flexible structure includes an array of features within a flexible material. The flexible structure is configured to transition between a stressed state and an unstressed state. When in the unstressed state, the features are uniformly spaced a first distance apart. The first distance is associated with the flexible structure reflecting a first range of wavelengths of visible light associated with a first color. When in the stressed state, at least some of the features are spaced a second distance apart. The second distance is associated with at least a portion of the flexible structure reflecting a second range of wavelengths of visible light associated with a second color different from the first color.

According to another embodiment, a method of forming a flexible structure having an appearance that changes color when subjected to stress. The method includes forming an array of features. Distances between the features cause interference of visible light incident on the array of features. The flexible structure is configured to transition between a stressed state and an unstressed state. When in the unstressed state, the distances between the features is a first distance associated with the flexible structure appearing a first color. When in the stressed state, a distance between at least some of the features changes to a second distance associated with at least a portion of the flexible structure appearing a second color different from the first color.

According to an additional embodiment, a pressure sensitive material having an appearance that changes color in response to an applied pressure is described. The pressure sensitive material includes a distribution of voids that are spaced apart such the voids interfere with visible light incident on the pressure sensitive material. In the absence of the applied pressure, spacing between the voids is such that the pressure sensitive material appears as a first color. When the pressure is applied to a region of the pressure sensitive material, the spacing between the voids changes within the region causing the region to appear a second color different from the first color.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
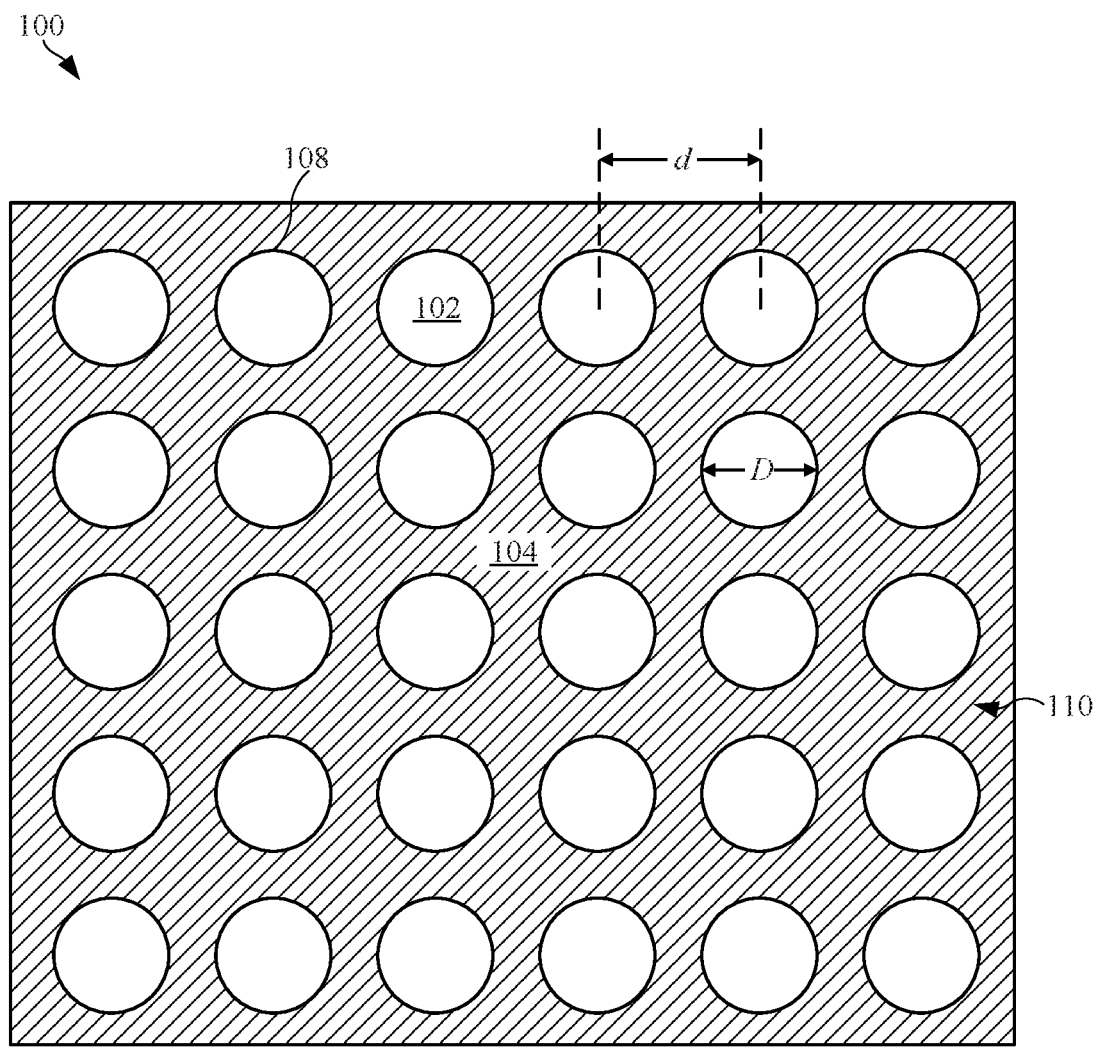
FIG. 1 shows a portion of a flexible photonic crystal structure.

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

Described herein are photonic crystal structures capable of changing color in response to pressure, bending or other types of strain. The photonic crystals include periodic microstructures formed within a deformable material such that when a compressive or tensile stress is applied to the photonic crystals, dimensional changes in the microstructures cause an apparent color shift. As used herein, the term "microstructure" is used to describe a structure of very small size, such as structures having dimensions on the scale of nanometers or micrometers. The photonic crystals can be incorporated into base materials for a number of applications, such as casings and enclosures for consumer products, fabrics for clothing, and thin films for application onto windows or display screens. The photonic crystals can be used for purely cosmetic purposes with dynamic color changes providing unusual visual effects, or they can provide a functional purpose, such as acting as visual sensors.

In some embodiments, the photonic crystals include particles of a first material embedded within a matrix of a second material, where the first material has a different index of refraction than the second material. For example, the particles can be composed of polymer, glass or ceramic, which are embedded within a matrix of polymer. Any suitable polymer material can be used. For example, polymer can be an organic polymer, a non-organic polymer or a combination thereof. In some embodiments, the polymer is a silicone or silicon-based polymer. The particles can have substantially the same diameter such that when the particles are closely packed within the second material, a periodic structure capable of producing photonic crystal colorization arises.

In some embodiments, the microstructures are voids formed within a flexible material using, for example, a laser. The voids can have any suitable shape and arrangement capable of forming the periodic microstructures of a photonic crystal. In some cases, the voids are in the shape of holes or channels within the flexible material. In some embodiments, the voids are filled with air, while in other embodiments the voids are filled with a liquid. In some embodiments, a composite material that includes multiple layers of photonic crystal structures is formed.

The flexible photonic crystal structures described herein are well suited for incorporation into consumer products. For example, the flexible photonic crystal structures described herein can be used to form aesthetically appealing products for computers, portable electronic devices, wearable devices, and device accessories, such as those manufactured by Apple Inc., based in Cupertino, Calif.

These and other embodiments are discussed below with reference to FIGS. 1-12. However, those skilled in the art will readily appreciate that the detailed description given herein with respect to these Figures is for explanatory purposes only and should not be construed as limiting.

Figure 2A:
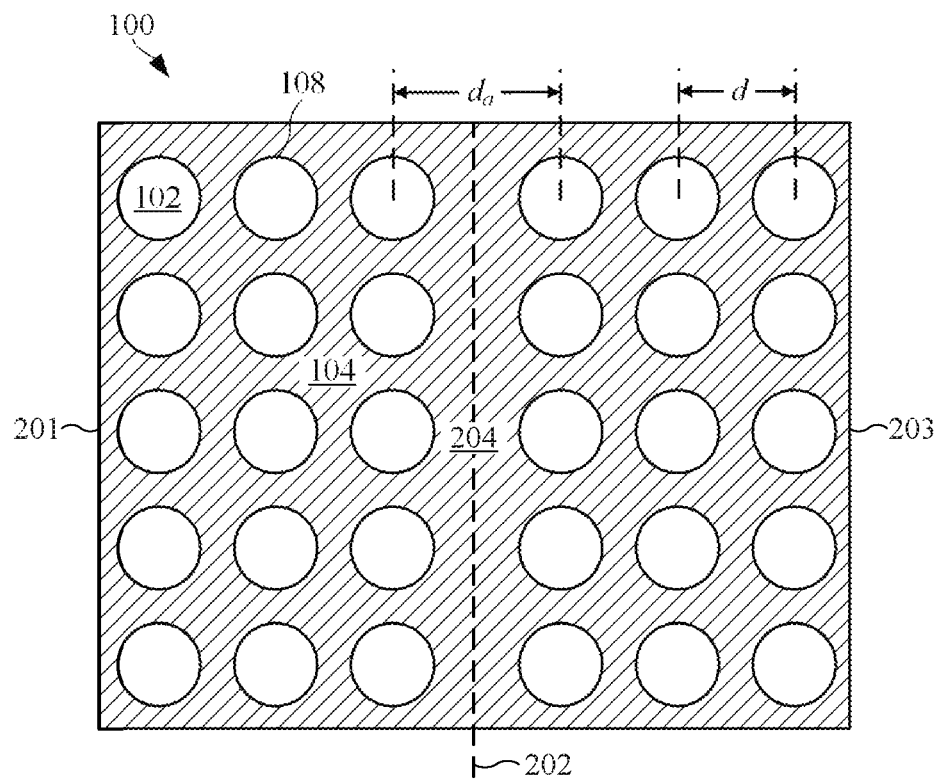
FIGS. 2A and 2B show portions of the photonic crystal structure of FIG. 1 being bent along a reference line.
Figure 2B:
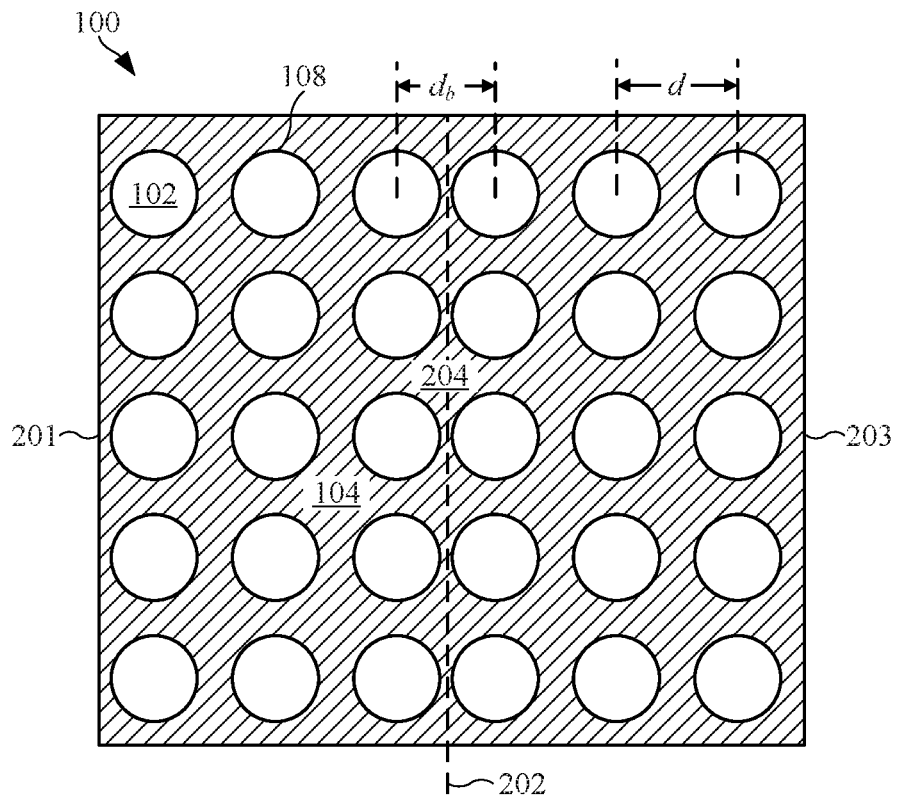
Figure 3:
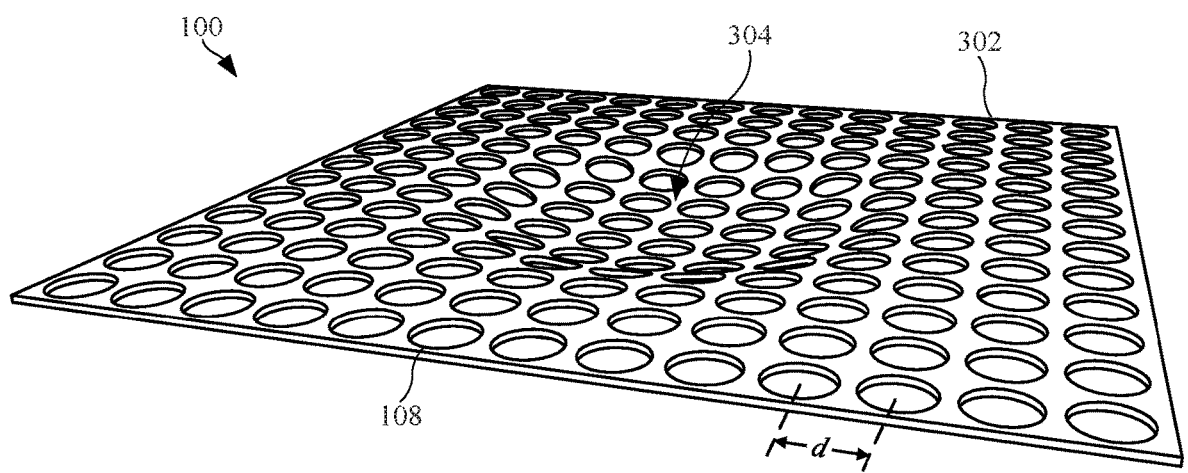
FIG. 3 shows a portion of the photonic crystal structure of FIG. 1 after a force was applied to its surface.

The flexible photonic crystal structures described herein can have any of a number of suitable characteristics and be manufactured using any of a number of suitable techniques. FIGS. 1-3 show different views of flexible photonic crystal structure 100, in accordance with some embodiments.

FIG. 1 shows a plan view of a portion of flexible photonic crystal structure 100. Flexible photonic crystal structure 100 includes first material 102 of distinctly defined features 108 surrounded by second material 104. Distance d refers to distances between adjacent features 108 as measured from the centers of features 108. In some embodiments, distance d between adjacent features 108 is substantially the same—that is features 108 are substantially uniformly spaced apart by distance d. In other embodiments, features 108 of one portion of flexible photonic crystal structure 100 are spaced substantially the same distance apart from each other while other features 108 of another portion of flexible photonic crystal structure 100 are spaced a different distance apart, such that flexible photonic crystal structure 100 appears to have different colors. First material 102 has a different refractive index (RI) than second material 104. For example, first material 102 and second material 104 can be made if different dielectric materials (e.g., polymer, glass and/or ceramic). In some embodiments, first material 102 is air (RI is about 1) where features 108 correspond to holes or voids (e.g., spherically shaped voids or cylindrically shaped voids) within second material 104. If filled with air, features 108 can be formed, for example, using a laser ablation process, whereby selected portions of second material 104 are removed by laser ablation. First material 102 can be in solid, semi-solid, liquid or gaseous form. In some embodiments, first material 102 and second material 104 are individually substantially transparent or clear, i.e., do not appear to have significant color, thus allow most or all incident light to pass through when not arranged in photonic crystal structure 100.

Flexible photonic crystal structure 100, like photonic crystal structures in general, includes an array 110 of features 108 where the array 110 interferes with visible light incident on flexible photonic crystal structure 100 and causes optical effects. Array 110 can also be referred to as an arrangement or periodic arrangement or series of features 108. In particular, features 108 act together to give flexible photonic crystal structure 100 a perceived color, referred to as structural coloration. Array 110 can be a two-dimensional or three-dimensional arrangement of features 108. If distance d between features 108 is in the order of wavelengths of light, flexible photonic crystal structure 100 will reflect incident light in a particular wavelength. Specifically, incident light with a wavelength about 2 times distance d between features 108 will be reflected, in accordance with solution to Maxwell's Equations for light diffraction. That is, the periodicity of features 108, corresponding to distance d between features 108, is around half the wavelength of the incident light in order to be reflected. Therefore, distance d of about 200 nanometers can correspond to photonic crystal structure 100 appearing a blue color, and distance d of about 350 nanometers can correspond to photonic crystal structure 100 appearing a red color. In addition, disallowed bands of wavelengths (band gaps) and groups of allowed bands of wavelengths (modes) result is a distinct optical appearance, such as high efficiency light reflection of specific wavelength corresponding to specific visible colors. In some embodiments, distance d is between about 200 to about 350 nanometers. In some embodiments, distance d is between about 400 to about 700 nanometers. In some embodiments, distance d is between about 100 to about 800 nanometers.

It should be noted that features 108 can have any suitable shapes and are not limited to dot/circular shapes shown in FIG. 1. For example, features 108 can have square, triangular, rectangular, oval, oblong, irregular, or linear shapes. In some embodiments, features 108 have different shapes within a single array 110.

Flexible photonic crystal structure 100 is flexible in that it can be deformed without breaking. To provide flexibility to flexible photonic crystal structure 100, one or both of first material 102 and second material 104 are made of a flexible material that can be physically bent, expanded or compressed. FIGS. 2A and 2B show portions of photonic crystal structure 100 being locally bent or creased along reference line 202.

FIG. 2A shows photonic crystal structure 100 bent along reference line 202 in a first direction with ends 201 and 203 "going into the page" such that region 204 of photonic crystal structure 100 is locally expanded. This causes features 108 within region 204 to be spaced wider apart from each other. In particular, features 108 in region 204 are spaced an expanded distance $d_a$ from each other, compared to features 108 in unexpanded regions that are space the original distance d apart from each other. Since the distance between features 108, in part, define the color of photonic crystal structure 100, widening this distance will change the color of photonic crystal structure 100 at region 202. In particular, widening the distance to $d_a$ will cause light having longer wavelengths to reflect off region 204 compared to surrounding unbent regions of photonic crystal structure 100. For example, distance d can be chosen such that unbent regions of photonic crystal structure 100 have a green color, while expanded distance $d_a$ causes region 204 to have a red color. In some embodiments, distance $d_a$ is expanded to a distance too large to cause in structural coloration of visible wavelengths of reflective light—in some cases resulting in region 204 appearing substantially transparent or colorless.

FIG. 2B shows photonic crystal structure 100 bent or creased along reference line 202 in a second direction with ends 201 and 203 "coming out of the page" such that region 204 of photonic crystal structure 100 is locally compressed. This causes features 108 within region 204 to be spaced closer together. In particular, features 108 in region 204 are spaced a compressed distance $d_b$ with respect to each other, compared to features 108 in uncompressed regions that are space the original distance d apart from each other. Compressed distance to $d_b$ will cause light having shorter wavelengths to reflect off region 204 compared to surrounding unbent regions of photonic crystal structure 100. For example, distance d can be chosen such that unbent regions of photonic crystal structure 100 have a green color, while compressed distance $d_b$ is smaller than distance d, resulting in region 204 appearing a blue color. In some embodiments, distance $d_b$ is compressed to a distance too small to cause in structural coloration of visible wavelengths of reflective light—in some cases resulting in region 204 appearing substantially transparent or colorless.

Photonic crystal structure 100 can also be responsive to other deformation forces other than bending or creasing. For example, opposing ends 201 and 203 can be pulled apart, thereby expanding portions of photonic crystal structure 100 and causing a corresponding color change in these expanded portions. Likewise, opposing ends 201 and 203 can be pushed together, thereby compressing portions of photonic crystal structure 100 and causing a corresponding color change in these compressed portions. In some embodiments, photonic crystal structure 100 deforms in response to heating or cooling such that photonic crystal structure 100 changes color in response to an applied heat or cooling.

In some embodiments, photonic crystal structure 100 flexes in response to a force that is exerted on its surface, such as a pressing force from a person's finger. FIG. 3 shows a perspective view of a portion of photonic crystal structure 100 after a force was applied to its surface 302. In particular, a pressing force was applied to surface 302 locally deforming region 304 of photonic crystal structure 100. Some of features 108 within deformed region 304 become positioned farther apart than distance d, while other features 108 within deformed region 304 become positioned closer to each other than distance d. This results in deformed region 304 appearing different colors than flat regions of photonic crystal structure 100. In this way, flexible photonic crystal structure 100 can act as a type of visible pressure sensor.

In some applications, flexible photonic crystal structure 100 is used as film or layer that is adhered to a surface of a larger structure, such as a display screen for an electronic device. In some applications, flexible photonic crystal structure 100 is cut into structures, much like a fabric. Note that FIG. 3 shows flexible photonic crystal structure 100 as having a layer or film shape. However, it should be noted the flexible photonic crystal structures described herein are not limited to those having layer or film shapes. For example, the flexible photonic structures can have a more substantial thickness, suitable being sculpted or machined into a larger structure. These and other embodiments are described below.

Figure 4:
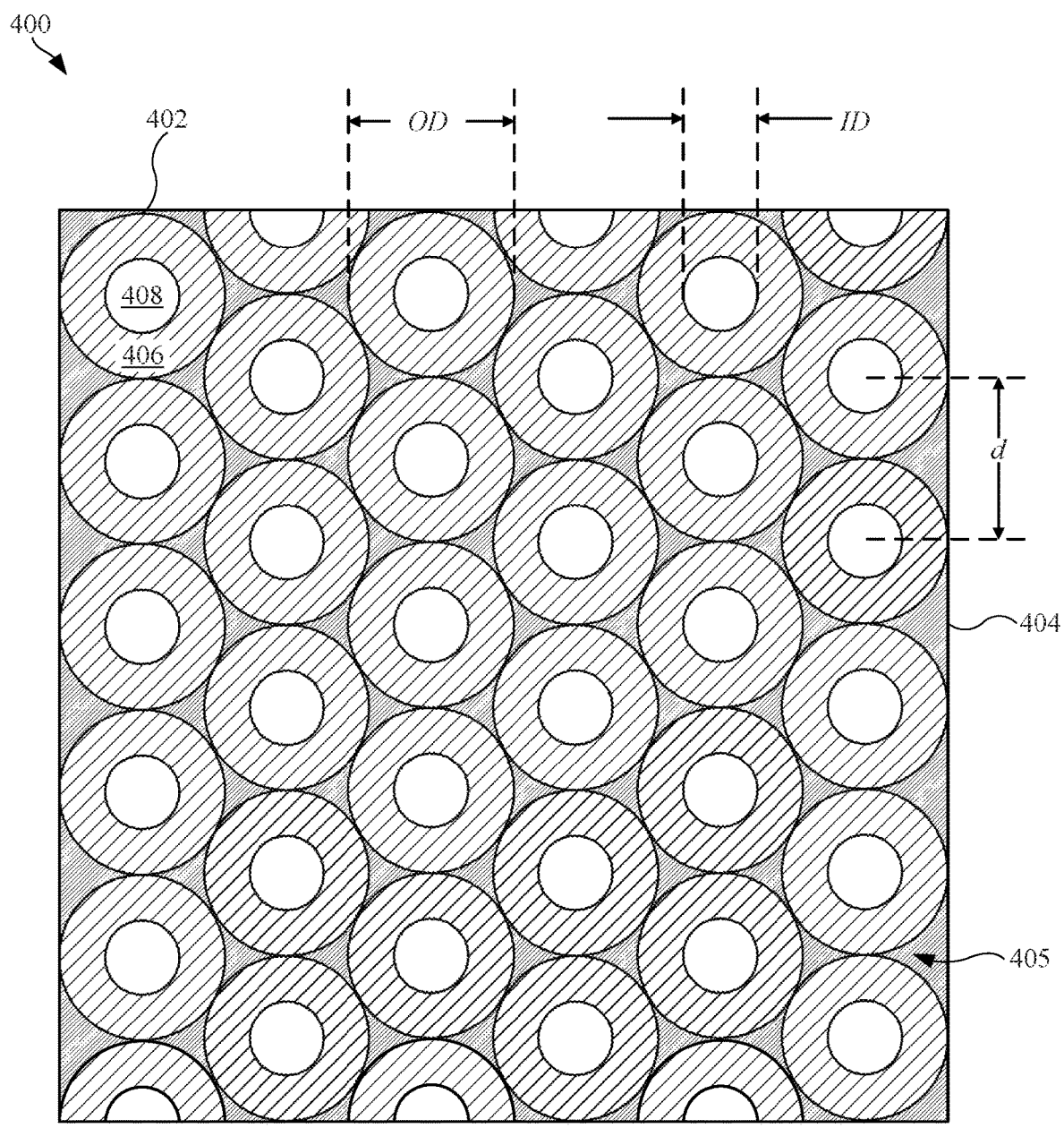
FIG. 4 shows a portion of a flexible photonic crystal structure that includes spherically shaped particles within matrix material.

In some embodiments, the flexible photonic crystal structures include particles made of one material that are packed within another material. FIG. 4 shows a plan view of a portion of flexible photonic crystal structure 400, which includes spherically shaped particles 402 arranged in a close-packed arrangement 405 within matrix material 404. Spherically shaped particles 402 are made of a first material 406 and have corresponding spherically shaped interior volumes 408, which can be filled with a second material. In some embodiments, spherically shaped particles 402 are hollow such that spherically shaped interior volumes 408 are filled with air. In this way, spherically shaped interior volumes 408 can correspond to an array of voids. This can be accomplished, for example, by coating carrier particles with first material 406, then removing the material of the carrier particles such that first material 406 have spherical shapes with voids. In other embodiments, spherically shaped interior volumes 408 are filled with liquid or solid material.

Spherically shaped particles 402 are in a close-packed arrangement such that a highly regular three-dimensional arrangement of spherically shaped particles 402 and spherically shaped interior volumes 408 is achieved. Spherically shaped particles 402 also have substantially the same outer diameter OD and inner diameter ID, which are in the scale of nanometers. In this way, flexible photonic crystal structure 400 includes an array of microstructures capable of providing photonic crystal structural coloration. That is, intra-particle distance d between adjacent spherically shaped particles 402 is about half the wavelength of a wavelength of reflected light. For example, intra-particle distance d of about 200 nanometers can result in photonic crystal structure 400 having a blue color, and intra-particle distance d of about 350 nanometers can correspond to photonic crystal structure 100 appearing a red color.

In some embodiments, matrix material 404 has substantially the same RI as first material 406, such that the photonic crystal optical affects are dependent upon the difference in RI of second material 408 and matrix material 404/first material 406. In other embodiments, first material 406 has substantially the same RI as second material 408, such that the photonic crystal optical affects are dependent upon the difference in RI of matrix material 404 and first material 406/second material 408. In other embodiments, matrix material 404, first material 406 and second material 408 are each has a different RI. In one embodiment, matrix material 404 and first material 406 are polymer materials. In a particular embodiment, first material 406 of spherically shaped particles 402 is a first type of polymer material and matrix material 404 is a second type of polymer material that has a different RI than the first type of material. In another embodiment, matrix material 404 and spherically shaped particles 402 are made of substantially the same material. In another embodiment, matrix material 404 is a polymer material, and first material 406 is glass or ceramic.

Matrix material 404, first material 406 and/or second material 408 can be flexible such that intra-particle distance d within certain regions of photonic crystal structure 400 are compressible or expandable, corresponding to a change in reflected wavelengths of light in these regions, similar to described above with reference to FIGS. 1-3. In this way, flexible photonic crystal structure 400 will be an original color when intra-particle distance d is unchanged, and have a different color at portions where flexible photonic crystal structure 400 is deformed, such as by bending, flexing, pulling apart, pushing together, pressing (e.g., by a finger), or heating/cooling. In some embodiments, flexible photonic crystal structure 400 becomes substantially transparent in those regions that undergo deformation, as described above.

Figure 5:
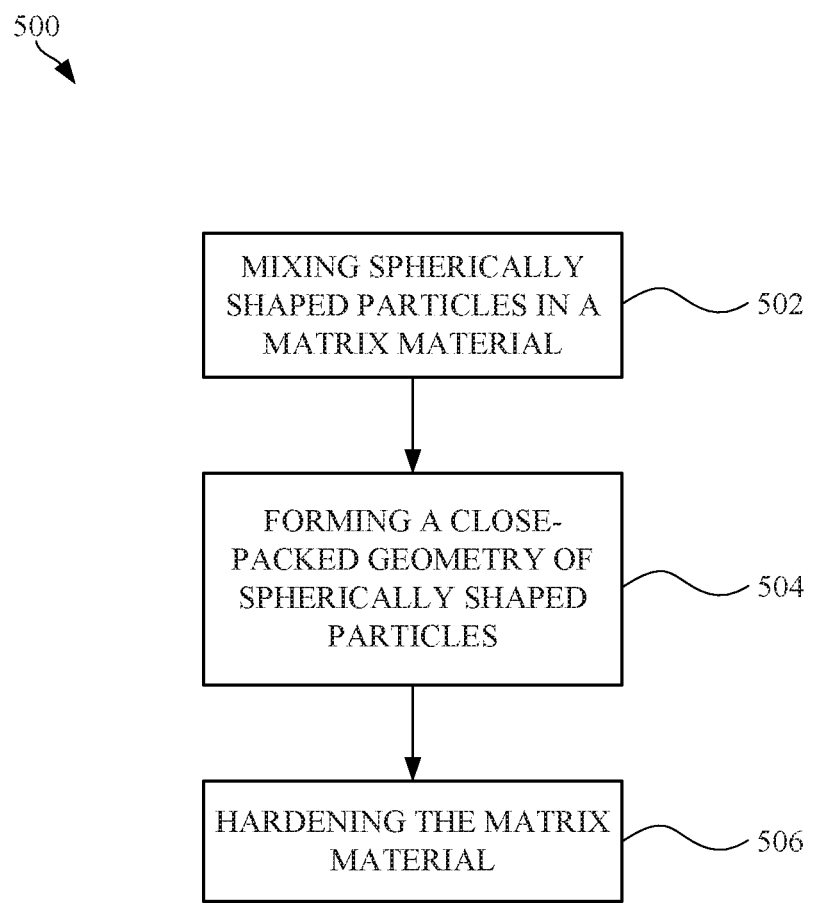
FIG. 5 shows a flowchart indicating a process for forming the flexible photonic crystal structure of FIG. 4.

Flexible photonic crystal structure 400 can be fabricated using any suitable technique. FIG. 5 shows flowchart 500 indicating a process for forming flexible photonic crystal structure 400, in accordance with some embodiments. At 502, a mixture is formed by mixing spherically shaped particles in a matrix material while the matrix material is in a liquid form. In one embodiment, the spherically shaped particles are made of a first type of polymer material and the matrix material is made of a second type of polymer material that has a lower melting point than the first type of polymer material. The matrix material can be liquefied by heated the matrix material to at least a melting point temperature of the second material, but not as high as the melting point of the first material. This way, the spherically shaped particles can remain intact during the mixing process.

At 504, a close-packed geometry the spherically shaped particles is formed. This forms a periodic optical nanostructure corresponding to a photonic crystal structure. The close-packed geometry can be accomplished by compressing the mixture under pressure and/or by allowing the spherically shaped particles to settle within the liquefied matrix material. In some embodiments, the spherically shaped particles are coated with an adhesion-promoting coating that promotes the adhesion of the spherically shaped particles to each other.

At 506, the matrix material is hardened, thereby fixing the relative positions of the spherically shaped particles in the close-packed geometry. The hardening process can include allowing the matrix material to cool to below its melting point. In some embodiments, the matrix material is made of an ultraviolet (UV) light curable material such that it can be hardened by exposure to UV light. The matrix material can be chosen based on its flexibility once cured (i.e., low Young's modulus). The resultant structure is a three-dimensional flexible photonic crystal structure.

Figure 6:
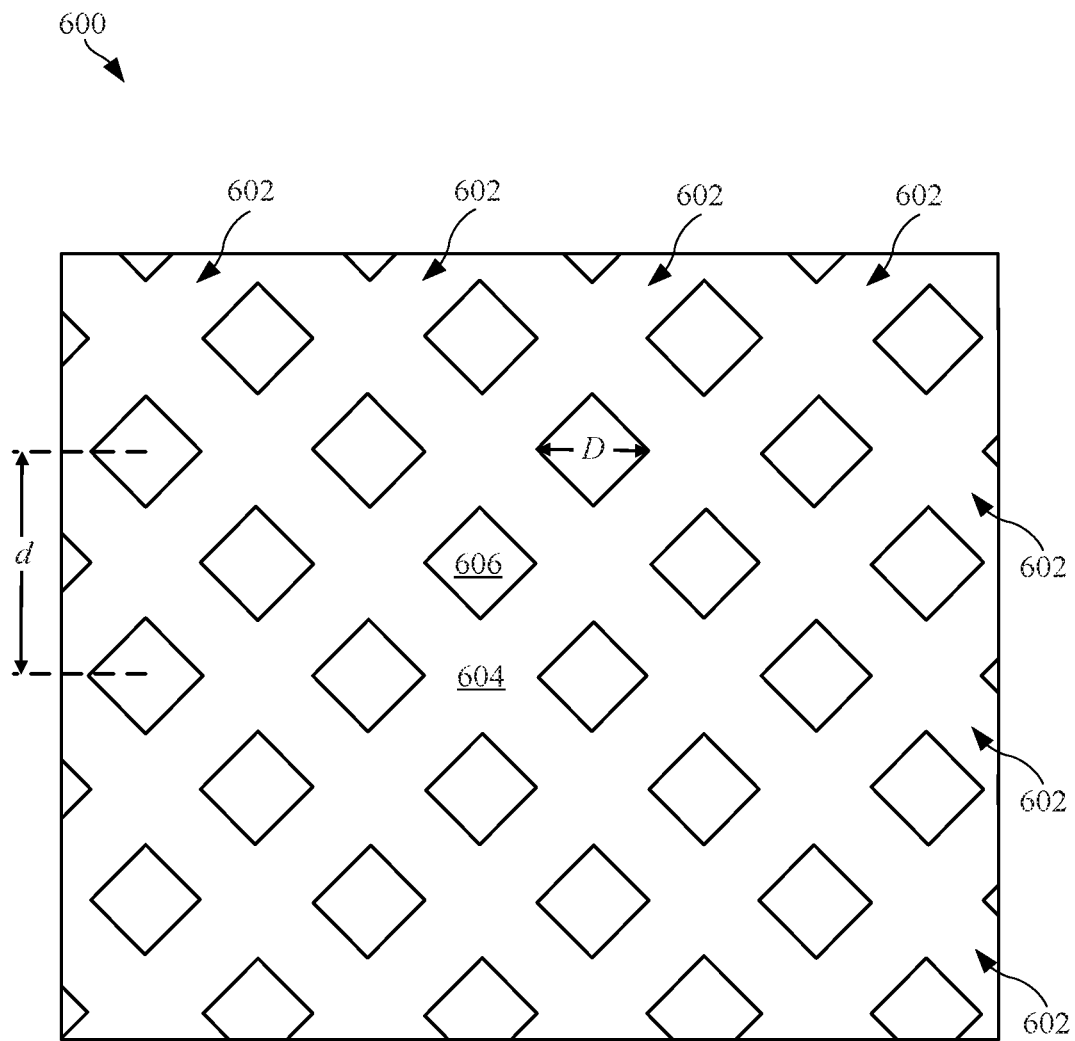
FIG. 6 shows a flexible photonic crystal structure having regularly spaced channels and voids.

FIG. 6 shows a plan view of flexible photonic crystal structure 600 formed using a laser process, in accordance with some embodiments. Flexible photonic crystal structure 600 includes channels 602 formed within matrix material 604. Channels 602 correspond to linear shaped voids cut within matrix material 604 using, for example, a laser from a laser. Channels 602 are oriented in a crisscross pattern in three-dimensions within matrix material 604 such that intersections of channels 602 form voids 606 spaced a consistent distance d apart from one another. In addition, voids 606 have substantially the same size (e.g., diameter D) and shape. In this way, channels 602 are formed such that matrix material 604 defines an array of substantially the same voids 606. The shape and size of voids 606 will depend, in part, on the size and number of crisscrossing channels 602 formed within matrix material 604. In some embodiments, three-sets of parallel channels 602 (e.g., formed in x, y, z directions) are used to form voids 606 having cubic shapes. The number, size and distance between channels 602 can be chosen such that distance d causes coloration by photonic crystal effects, as described above. That is, distance d can be chosen to result in photonic crystal structure 600 to reflect any of a number of visible wavelengths of light and appear a corresponding color.

Matrix material 604 is a flexible material, such as a polymer material, that can be deformed (e.g., compressed or expanded) so as to change the distance d, similar to as described above with reference to flexible photonic crystal structures 100 and 400. For example, a compressive force can be applied to regions of photonic crystal structure 600 to locally reduce distance d in those compressed regions, resulting in shorter wavelengths of light being reflected off of those compressed regions of photonic crystal structure 600. Likewise, an pulling or expanding force can be applied to regions of photonic crystal structure 600 to locally increase distance d in those expanded regions, resulting in longer wavelengths of light being reflected off of those expanded regions of photonic crystal structure 600. The compressing and expanding forces can be applied by bending, pulling, pressing, pushing, or heating/cooling photonic crystal structure 600.

Figure 7:
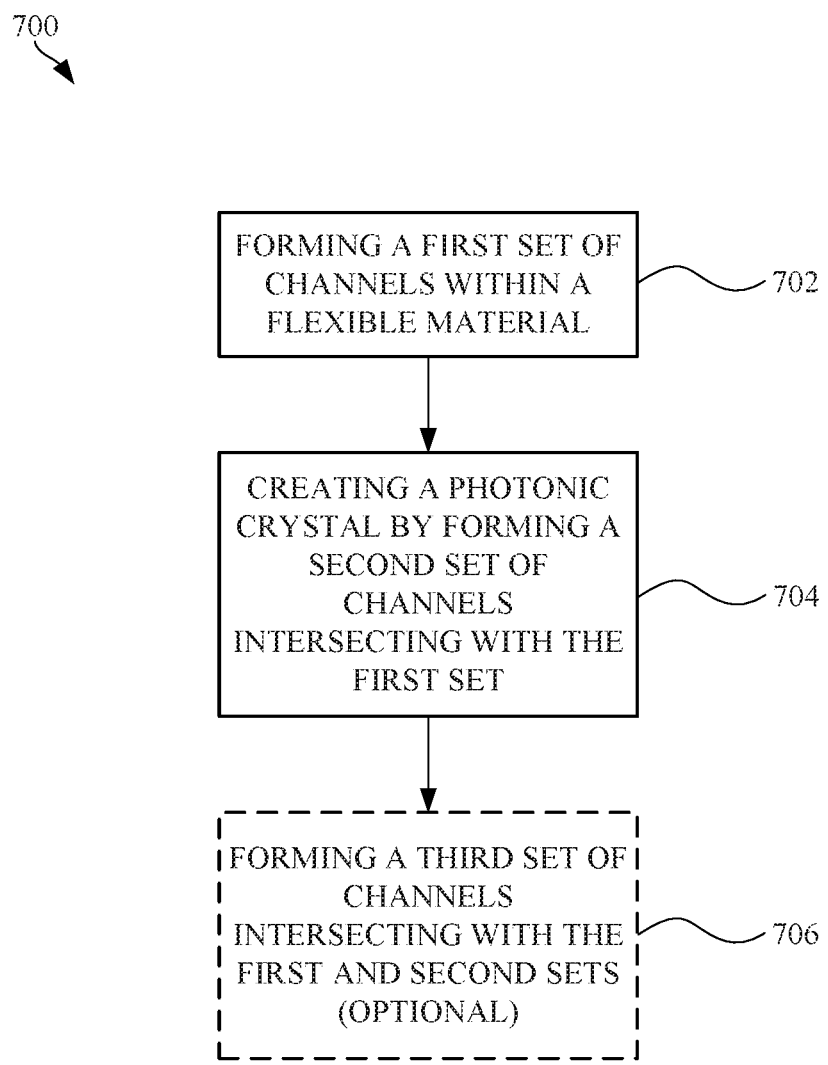
FIG. 7 shows a flowchart indicating a process for forming the flexible photonic crystal structure of FIG. 6.

FIG. 7 shows flowchart 700 indicating a process for forming flexible photonic crystal structure 600, in accordance with some embodiments. At 702, a first set of regularly spaced channels is formed within a flexible material in accordance with a first plane. The flexible material can include any suitable compressible material, such as polymer material. The channels can have a linear shape and can be formed using a laser beam that is produced by laser. Any suitable type of laser can be used—which can depend, in part, on the type of flexible material. In some embodiments, the laser beam ablates portions of the flexible material, thereby forming the channels. Lasers can provide a precision cutting and material removal mechanism for create channels having very small dimensions (e.g., widths) with precise spacings between the channels.

At 704 a second set of regularly spaced channels is formed within the flexible material in accordance with a second plane that is non-parallel to the first plane such that the second set of channels intersect with the first set of channels. The points of intersection correspond to voids having substantially the same shape and that are substantially the same distance apart from one another, with the surrounding flexible material defining the size and shape of the voids. In this way, a two-dimensional array is formed within the flexible material. The size and distance between the voids can be chosen such that the light incident on the array reflects light in accordance with a photonic crystal. In some embodiments, the resultant photonic crystal is periodic in two dimensions.

At 706, a third set of regularly spaced channels is optionally formed within the flexible material in accordance with a third plane that is non-parallel to the first plane and the second plane. The third set of channels allows for more dimension freedom. In particular, a photonic crystal that is periodic in three dimensions can be formed. It should be noted that flowchart 700 does not necessarily indicate a temporal sequence of 702, 704 and 706. For example, forming the first and second sets of channels (702 and 704) can be done in a single laser procedure. Likewise, forming the first, second and third sets of channels (702, 704 and 706) can be done in a single laser procedure.

Figure 8A:
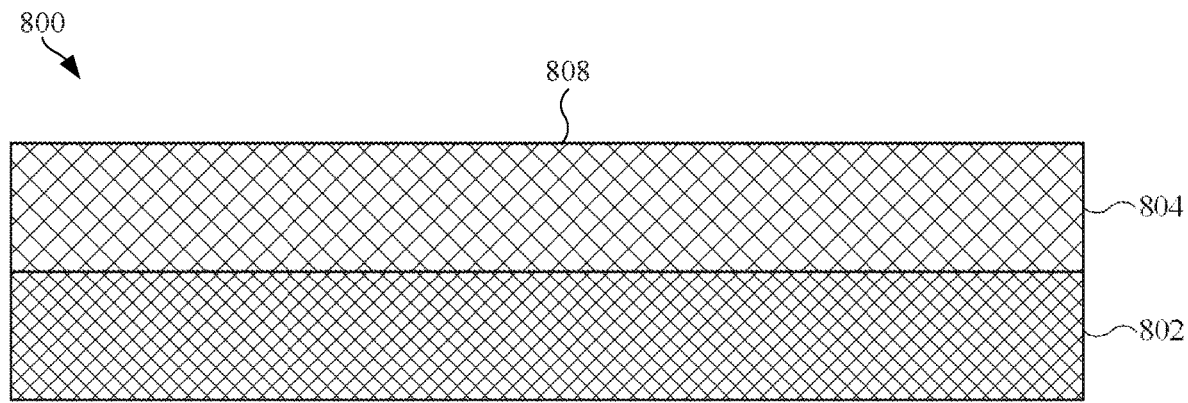
FIGS. 8A and 8B show portions of layered flexible photonic crystal structures, each having multiple layers of photonic crystal structures.
Figure 8B:
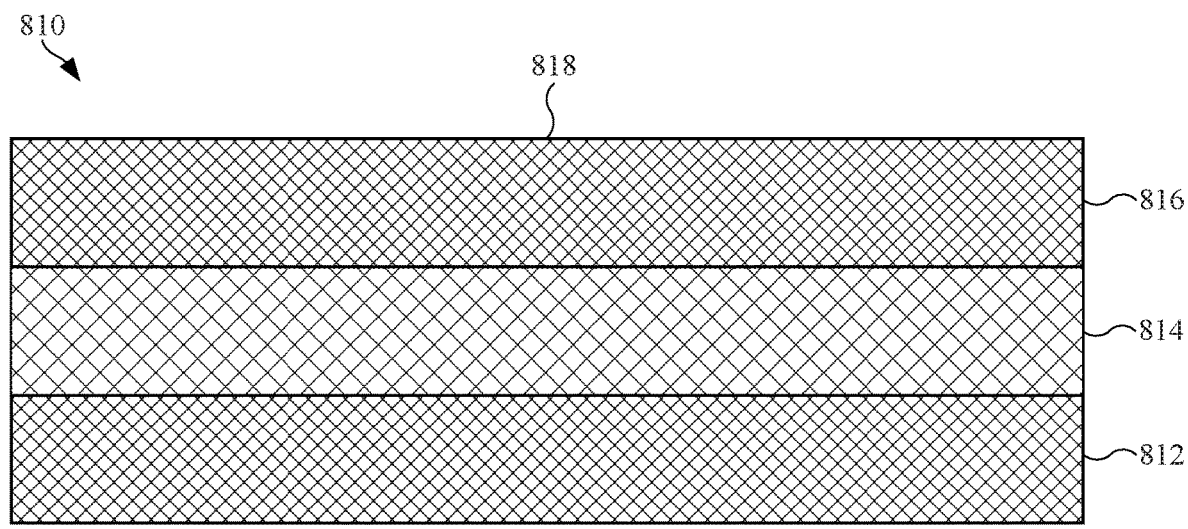

FIGS. 8A and 8B show cross section views portions of layered flexible photonic crystal structures 800 and 810, respectively, in accordance with some embodiments. Layered flexible photonic crystal structures 800 and 810 each include multiple layers of photonic crystals. Layered flexible photonic crystal structure 800 of FIG. 8A includes first layer 802 and second layer 804, each of which is a photonic crystal structure in itself. That is, each of first layer 802 and second layer 804 has an array of a first material (e.g., air within voids) within a second material, where the first material has a first RI that is different from a second RI of the second material and where the array produces structural coloration in accordance with a photonic crystal. First layer 802 and second layer 804 can be coupled together using, for example, adhesive or by melting/molding first 802 and second 804 layers together.

In some embodiments, first layer 802 and second layer 804 have different periodic structures and therefore reflect different visible wavelengths of light. For example, first layer 802 can have a photonic crystal structure suitable for reflecting wavelengths associated with a blue color and second layer 804 can have a photonic crystal structure suitable for reflecting wavelengths associated with a red color. This can give layered flexible photonic crystal structure 800, when viewing surface 808, a combined blue and red appearance color, perhaps a purple color. Likewise, if first layer 802 reflects wavelengths associated with a blue color and second layer 804 reflects wavelengths associated with a green color, layered flexible photonic crystal structure 800 at surface 808 can appear to have a combined blue and green color, perhaps a bluish-green or aqua color when viewing surface 808. In this way, the multiple layered configuration of layered flexible photonic crystal structure 800 can provide a variety of colors that may be difficult to achieve using only a single layer of photonic crystal. In addition, one or both of first layer 802 and second layer 804 can be flexible so as to change color in response to stress or strain, such as bending, flexing, pulling apart, pushing together, pressing or heating/cooling—thereby providing even more color variations and possible combinations.

FIG. 8B shows flexible photonic crystal structure 810, which includes three layers: first layer 812, second layer 814 and third layer 816—each of which is a photonic crystal structure. This configuration allows for even more possible color variations for flexible photonic crystal structure 810 when viewing surface 818. For example, first layer 812, second layer 814 and third layer 816 can each have different periodic structures and reflect different visible wavelengths of light. Alternatively, first layer 812 and third layer 816 can reflect the a first set of visible wavelengths of light, while second layer 814 reflects a second set of visible wavelengths of light different from the first set. Note that flexible photonic crystal structures having any suitable number of layers and combinations can be used, and are limited by two or three layers shown in FIGS. 8A and 8B.

There are numerous applications for the flexible photonic crystal structures described herein, such flexible photonic crystal structures 100, 400, 600, 800 and 810 described above. Some such applications are described below with reference to FIGS. 9A-12.

Figure 9A:
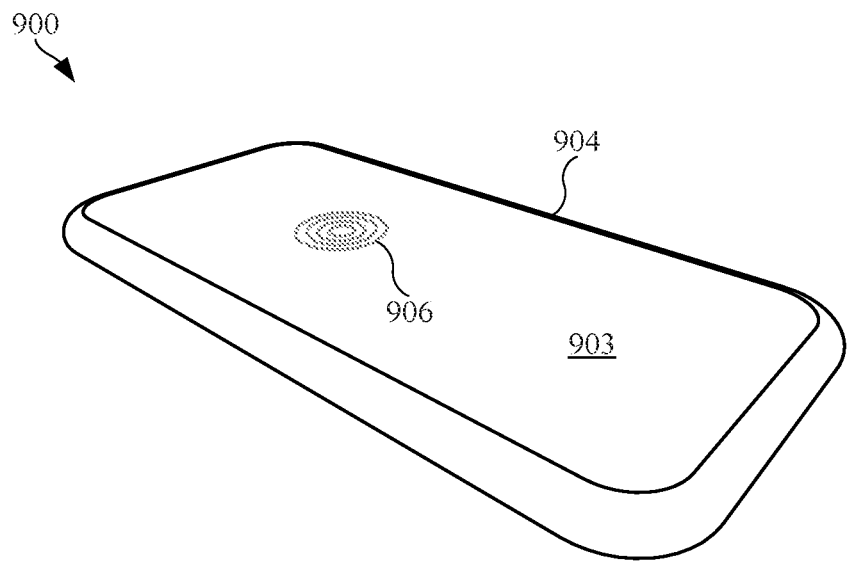
FIGS. 9A and 9B show a case that includes a photonic crystal structure.
Figure 9B:
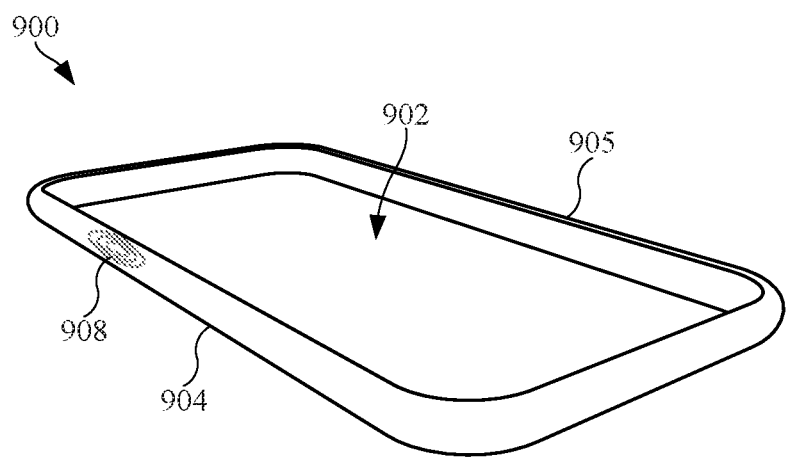

FIGS. 9A and 9B show perspective views of case 900 that includes a photonic crystal structure, in accordance with some embodiments. FIG. 9A shows a back view and FIG. 9B shows a front view of case 900. Case 900 is designed to cover and protect part of an electronic device, such as a mobile phone, tablet device or other portable electronic device. Cavity 902 is shaped and sized to accommodate the electronic device therein, such that the back and sides of the electronic device are covered. In some embodiments, case 900 is flexible so that portions of case can be bent or twisted to position the electronic device within cavity 902.

Portions of case 900, such as exterior surfaces 904, include a flexible photonic crystal structure such as described above. In some embodiments, the flexible photonic crystal structure in the form of a film or layer that is applied onto a larger support structure that defines an overall shape of case 900. In other embodiments, the flexible photonic crystal structure includes the support structure of case 900—that is, the flexible photonic crystal structure is a bulk flexible material that is shaped in accordance with the shape of case 900.

The photonic crystal structure of case 900 can change color in response to stress or strain, such as a pressure applied to back surface 903 and side surfaces 905. For example, pressed regions 906 and 908 of can visually change color in response to a pressing force from a user's finger. That is, the applied pressure deforms the periodic photonic crystal structure pressed regions 906 and 908 such that these regions reflect a different color than un-pressed regions of case 900. For example, pressed regions 906 and 908 can appear blue while un-pressed regions surrounding pressed regions 906 and 908 appear green or red. In some embodiments, pressed regions 906 and 908 appear multi-colored. In some embodiments, pressed regions 906 and 908 can change to a substantially colorless or translucent appearance.

The shapes of first region 906 and second region 908 correspond to the deformed areas of the photonic crystal structure. In some embodiments, flexible photonic crystal structure is made of a flexible material that is formulated to have a particular timescale for re-expansion after compression, such that pressed regions 906 and 908 take time to re-expand and return to an original color, thereby appearing to fade away.

Figure 10:
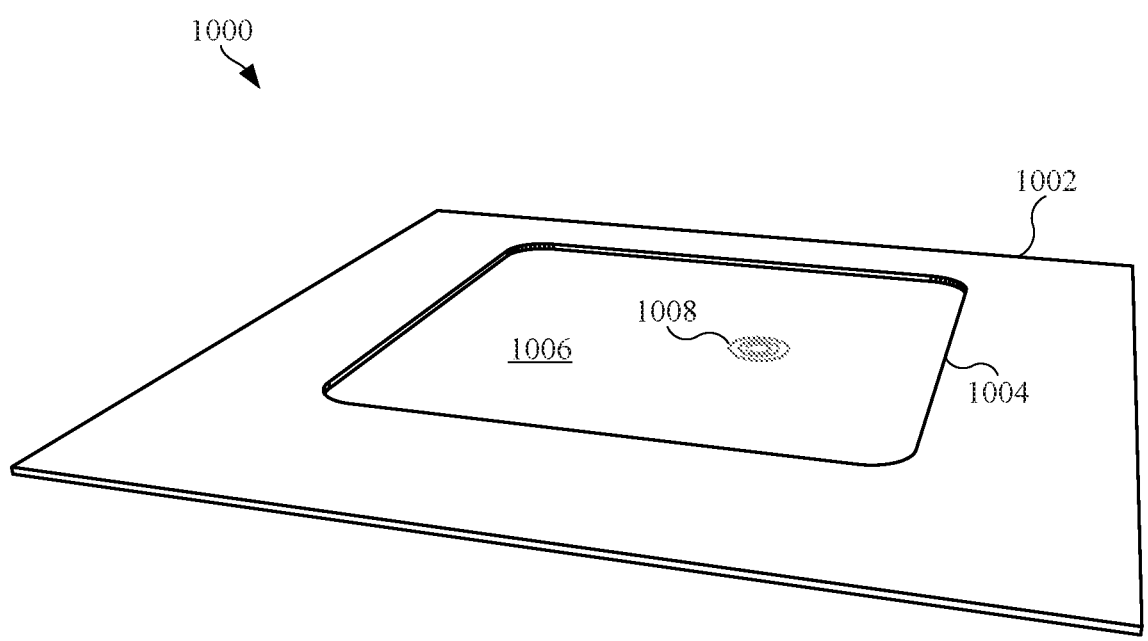
FIG. 10 shows a display assembly that includes a flexible photonic crystal structure.

The flexible photonic crystal structures described herein can also be used with display screen for an electronic device. FIG. 10 shows display assembly 1000, which includes housing 1002 and display screen 1004. In some embodiments, display screen 1004 is a touch screen. Display assembly 1000 can correspond to a portion of a display monitor as part of a computing device. Flexible photonic crystal structure 1006 is positioned on display screen 1004 such that a user touches flexible photonic crystal structure 1006 when attempting to touch display screen 1004. In some embodiments, flexible photonic crystal structure 1006 is an integral part of the display screen assembly of the computing device. In other embodiments, flexible photonic crystal structure 1006 is in the form of a film that is applied onto display screen 1004 using, for example, an adhesive.

Pressed region 1008 corresponds to a region of flexible photonic crystal structure 1006 that has been pressed, such as by a user's finger. This locally deforms the periodic structure of flexible photonic crystal structure 1006, thereby causing pressed region 1008 to change color. In this way, flexible photonic crystal structure 1006 can act as a sensor that shows visible evidence of display screen 1004 being touched. In some embodiments, pressed region 1008 changes to a substantially colorless or translucent appearance. As described above, the flexible material of flexible photonic crystal structure 1006 is chosen to have a particular timescale for re-expansion and return to an original color.

Figure 11A:
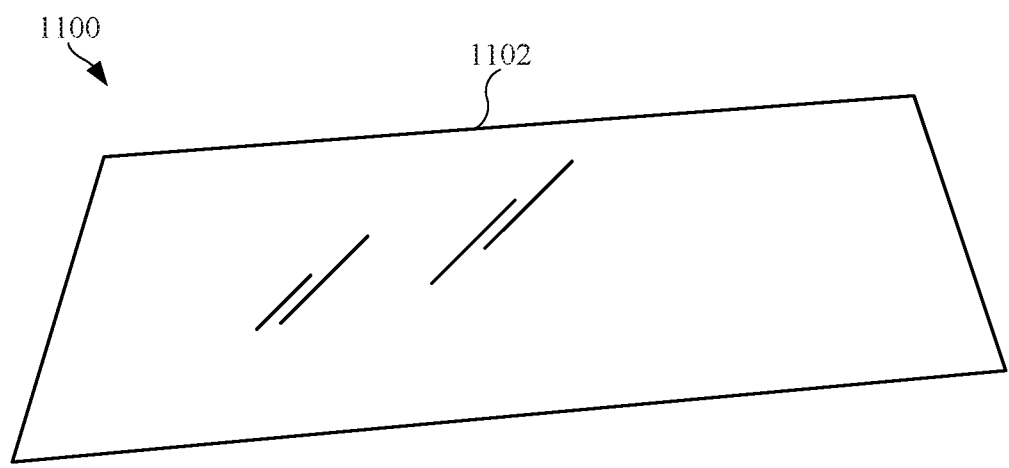
FIGS. 11A and 11B show a flexible screen that includes a flexible photonic crystal structure.
Figure 11B:
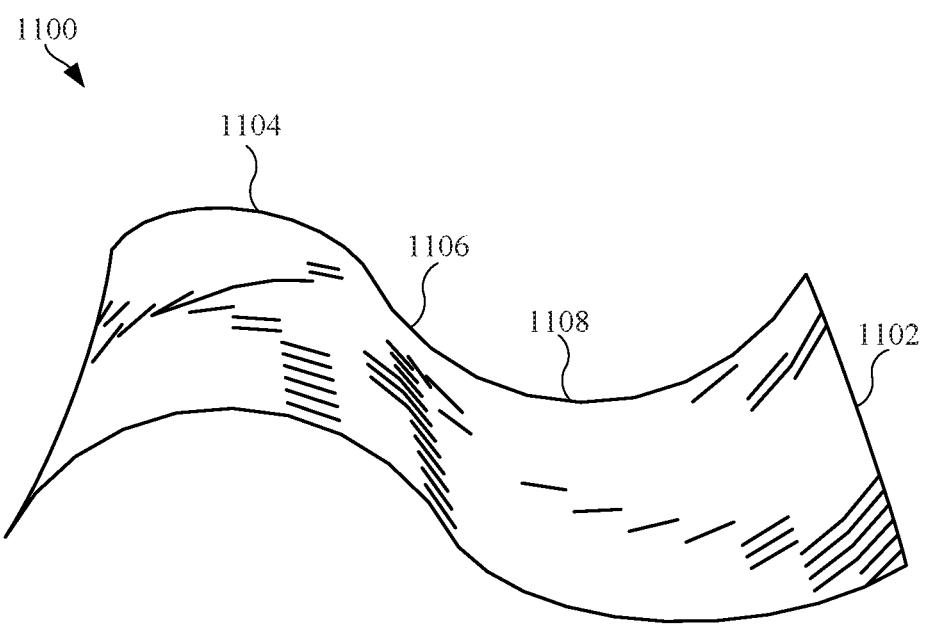

In some embodiments, the flexible photonic crystal structures are used to form flexible screen. FIGS. 11A and 11B show perspective views of flexible screen 1100, which can be used incorporated in a consumer product, such as a flexible display for an electronic device or a flexible electronic paper display. Flexible screen 1100 includes flexible photonic crystal structure 1102. In some embodiments, flexible photonic crystal structure 1102 comprises one or more layers as part of flexible sheet 1100—while in other embodiments, flexible photonic crystal structure 1102 and flexible screen 1100 are one in the same. FIG. 11A shows flexible screen 1100 in a flat configuration such that the periodic structure of flexible photonic crystal 1102 is substantially consistent. This flat configuration causes flexible photonic crystal structure 1102 to appear as a single consistent color. In some embodiments, flexible screen 1100 appears substantially colorless in the flat configuration shown in FIG. 11A.

Figure 12:
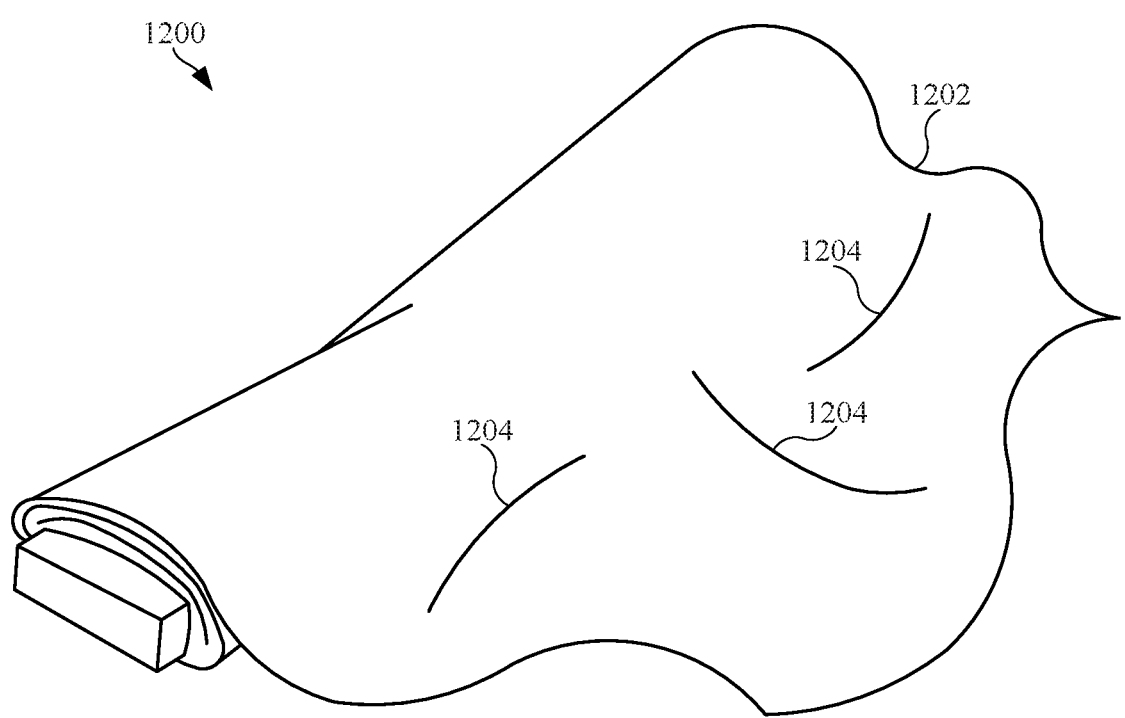
FIG. 12 shows a flexible sheet of material that includes a flexible photonic crystal structure.

FIG. 11B shows flexible screen 1100 in a flexed configuration where different portions of flexible photonic crystal structure 1102 are flexed at varying degrees, resulting in flexible screen 1100 taking on a corresponding pattern of colors. For example, first region 1104 can be flexed a first amount such that first region 1104 appears a first color, second region 1106 can be flexed a second amount such that second region 1106 appears a second color, and third region 1108 can be flexed a third amount such that third region 1106 appears a third color. The result is flexible screen 1100 takes on a multicolored pattern appearance in response to bending. Flexible screen 1100 can also respond to stretching, compressing, bending, pressing and twisting forces to achieve correspondingly different color patterns. This gives flexible screen 1100 the ability to dynamically change color in accordance with its change in shape. In some embodiments, flexible screen 1100 is substantially colorless in the flat configuration of FIG. 11A and becomes colored in the flexed configuration of FIG. 11B. In other embodiments, flexible screen 1100 appears colored in the flat configuration of FIG. 11A and becomes substantially colorless in the flexed configuration of FIG. 11B In some embodiments, the flexible photonic crystal structures are used as soft-good material. FIG. 12 shows a perspective view of a roll 1200 of flexible sheet 1202. Flexible sheet 1202 includes one or more layers of a flexible photonic crystal structure such that stresses placed on flexible sheet 1202, such as stretching, compressing, bending, pressing and twisting forces, can result in a corresponding color change. For example, creases 1204 within flexible sheet 1202 can have a different color than surrounding portions of flexible sheet 1202. Flexible sheet 1200 can be used to fabricate any of a number of consumer products, such as bags and backpacks that change color along creases and folds and that change color based on whether a compressive or tensile force is applied. Other products include wearable items, such as clothing (e.g., shirts or portions of shirts) and accessories such as wristbands, headbands, jewelry, gloves, belts, watches, ties, scarves, etc.

The flexible photonic crystal structures described herein can be used for any of a number of applications other than those described above. For example, the flexible photonic crystal structures can be used to form a track pad or mouse that changes color in locations where it is pressed. The flexible photonic crystal structures can be used to form toys, such as balls that change color when bounced off the floor. Other applications include stress balls or exercise equipment that change color in locations that are squeezed.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A structure that undergoes a change in color when subjected to stress, the structure comprising:
   a region having features comprising intersecting channels that are spaced apart and define voids capable of interfering with visible light incident thereupon, wherein:
      when the region is in an unstressed state, the features are spaced apart by a first distance corresponding to reflecting a first range of wavelengths of the incident visible light, wherein the first range of wavelengths is associated with a first color, and
      otherwise, when the stress is applied to the region, at least some of the features are spaced apart by a second distance, the second distance associated with at least a portion of the region reflecting a second range of wavelengths of the incident visible light, the second range of wavelengths associated with a second color different from the first color.

2. The structure of claim 1, wherein at least one of the first distance or the second distance is between about 100 to about 800 nanometers.

3. The structure of claim 1. wherein the features are disposed in a flexible material, the features comprising a first dielectric material having a first refractive index and the flexible material comprising a second dielectric material having a second refractive index.

4. The structure of claim 3, wherein the first dielectric material comprises air and the second dielectric material comprises a polymer.

5. The structure of claim 3, wherein the first dielectric material comprises a first polymer and the second dielectric material comprises a second polymer different from the first polymer.

6. The structure of claim 1, wherein the features comprise spherically shaped particles and the first distance corresponds to a distance between centers of the spherically shaped particles.

7. The structure of claim 1, wherein the structure comprises walls that define a cavity, and the walls are capable of carrying a portable electronic device within the cavity.

8. The structure of claim 1, wherein the region of features corresponds to an external surface.

9. The structure of claim 6, wherein the spherically shaped particles comprise a polymer.

10. A method of forming a flexible structure having an appearance that changes color when subjected to stress, the method comprising:
    forming the flexible structure comprising an array of features comprising intersecting channels that are spaced apart from each other, wherein the features are capable of causing interference of visible light incident on the array of features, and a region of the flexible structure comprises at least some of the features, the flexible structure being configured to transition between an unstressed state and a stressed state, wherein:
when the region is in the unstressed state, the features of the region are spaced apart by a first distance, the first distance associated with the region appearing a first color, and
when the region is in the stressed state, at least some of the features of the region are spaced apart by a second distance, the second distance associated with at least a portion of the region appearing a second color different from the first color.

11. The method of claim 10, wherein forming the array of features comprises:
arranging spherically shaped particles within a flexible material, the spherically shaped particles having spherically shaped interior voids.

12. The method of claim 11, wherein the spherically shaped particles are comprised of a first type of polymer and the flexible material is comprised of a second type of polymer different from the first type of polymer.

13. The method of claim 11, wherein the spherically shaped particles comprise a material, and the flexible material comprises the material.

14. The method of claim 10, wherein forming the array of features comprises:
forming intersecting channels within a flexible material, wherein intersections of the channels define voids within the flexible structure.

15. The method of claim 14, wherein the intersecting channels are formed using a laser ablating process.

16. A pressure sensitive material that undergoes a change in color when subjected to pressure, the pressure sensitive material comprising:
a structure having a distribution of voids defined by intersecting channels that, wherein a region of the structure comprises a portion of the distribution of voids, the portion configured to interfere with visible light incident on the portion, and to transition between states when the region is subjected to the pressure, wherein:
in an absence of pressure applied against the region, the distribution of voids are spaced apart by a first distance such that the region appears as a first color, and
in a presence of pressure applied against the region, the distribution of voids are spaced apart by a second distance such that the region appears as a second color different from the first color.

17. The pressure sensitive material of claim 16, wherein the distribution of voids are in a three-dimensional array.

18. The pressure sensitive material of claim 16, wherein the pressure sensitive material is a film capable of covering a display of a portable electronic device.

19. The pressure sensitive material of claim 16, wherein the structure includes walls that define a cavity, and the walls are capable of carrying a portable electronic device within the cavity.

20. The pressure sensitive material of claim 16, wherein the pressure sensitive material is composed of a polymer.

* * * * *